Oct. 22, 1974  I. L. EDWARDS  3,843,514
MOLECULAR SIEVE PROCESS
Filed Sept. 18, 1972  2 Sheets-Sheet 2

FIG. 2.

OPERATING SEQUENCE WITH 3 AND 4 ADSORBERS.

3 ADSORBERS IN OPERATION. (1 ADSORBER BEING REGENERATED.)

4 ADSORBERS IN OPERATION.

TIME (SECONDS)

United States Patent Office 3,843,514
Patented Oct. 22, 1974

3,843,514
MOLECULAR SIEVE PROCESS
Ivor Lloyd Edwards, Ashford, England, assignor to The British Petroleum Company Limited, London, England
Filed Sept. 18, 1972, Ser. No. 289,834
Claims priority, application Great Britain, Sept. 24, 1971, 44,632/71
Int. Cl. C07c 7/12
U.S. Cl. 208—310     5 Claims

ABSTRACT OF THE DISCLOSURE

When 3 or more beds of molecular sieve are employed for the separation of $n$-paraffins, all the beds are used at once and periodically one bed is taken out of use for regeneration and the cycle timings adjusted in accordance with the formula $$\frac{p+d}{f} = n-1$$

Figure 1:
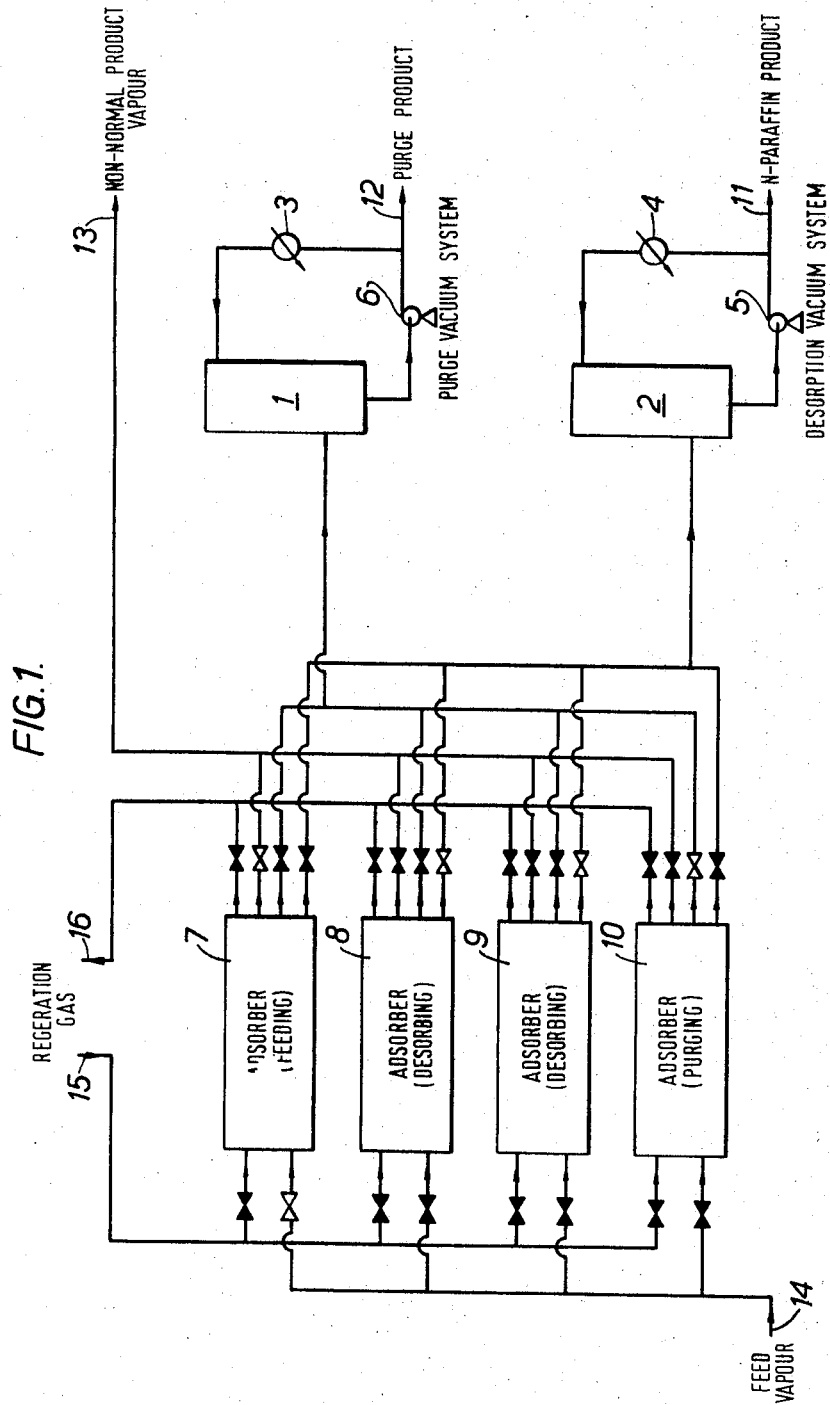

where $p$, $d$, $f$ are the durations of the purge, desorption and feed and $n$ is the number of beds.

---

This invention relates to a molecular sieve process employing a number of beds of molecular sieve in which process one bed is periodically taken out of use e.g. for regeneration, inspection or replacement.

Molecular sieve processes for the extraction of $n$-paraffins from mixtures of the same with branched chain and/or cycloparaffins employing stages of adsorption, purge and desorption have been described, for example in UK Pat. No. 944,441. In the operation of a molecular sieve process using a number of beds for the separation of $n$-paraffins it is often necessary to take one bed out of use e.g. for regeneration, inspection or replacement of the sieve. UK Pat. 944,441 discloses a process using five beds of molecular sieve in which four of the beds are in use, while the fifth bed is being regenerated. In this described process one bed is permanently out of use and it is an object of the present invention to make a more efficient use of the beds and thereby give a saving in the capital cost of the system.

A process has now been devised in which three or more beds are employed and in which the cycle timings are changed when one bed is taken out of use.

Thus, according to the present invention a process for the separation of $n$-paraffins from mixtures of the same with branched chain and/or cycloparaffins by employing 3 or more beds of 5 A. molecular sieve at a temperature of 300 to 450° C. and using stages of adsorption, purge and desorption wherein to maintain a continuous feed the durations of three stages satisfy the formula $$\frac{p+d}{f} = \text{number of adsorbers} - 1$$

where $p$, $d$ and $f$ are the durations of the purge, desorption and adsorption stages respectively, comprises periodically taking one bed out of use and adjusting the cycle timings of the remaining beds so as to maintain operation in accordance with the above formula.

Regeneration can be effected by contacting with oxygen at temperatures up to about 540° C. as described in UK Pat. No. 965,008.

The general operating conditions such as temperatures, pressures space velocities, diluents can be as described in UK Pats. 944,441 or 1,026,116.

The $n$-paraffin can be removed from the sieve by displacement e.g. by a lower boiling $n$-paraffin such as $n$-heptane or by pressure reduction. The purge stage can be effected by an inert gas such as nitrogen or by pressure reduction. The purge and desorption stages can be effected e.g. as described in UK Pat. No. 944,441 or by pressure reduction e.g. as described in UK Pat. No. 1,026,116. Preferably the desorption is effected by pressure reduction by directly condensing the desorption effluent by the method described in UK Pat. 1,110,494.

The process can be used for the treatment of gasoline, kerosine and gas oil range feedstocks.

The process temperature lies within the range 300–450° C., and preferred temperatures for different range feedstocks are 325–375° C. for gasoline, 350–400° C. for kerosine, and 380–420° C. for gas oil. In the present specification the terms gasoline, kerosine, and gas oil have their normal meanings as used in the petroleum industry, i.e. they refer respectively to fractions boiling substantially within the ranges $C_4$–200° C., 150–300° C., and 200–450° C.

The adsorption stage is desirably operated at a maximum pressure of 3–150 p.s.i.a., the preferred pressure varying with the feedstock being 40–100 p.i.s.a. for gasoline, 15–35 p.s.i.a. for kerosine, and 10–30 p.s.i.a. for gas oil. When purging is by pressure reduction the intermediate purge pressure may be within the range 0.1–25 p.s.i.a., the preferred pressure also depending upon the actual boiling range of the feedstock. For example, when treating a gasoline fraction of average carbon number about $C_7$ boiling in the range $C_4$–180° C. a purge pressure range of 2–20 p.s.i.a. is preferred, while 1.0–3.0 p.s.i.a. is preferred for kerosine range fractions of average carbon number about $C_{11}$ boiling between 150–250° C., and 0.1–1.0 p.s.i.a. for gas oil fractions and higher boiling fractions ranging between 200–350° C. Similarly the desoption pressure is within the range 0.05–2.0 p.s.i.a., the preferred pressure varying according to the feedstock boiling range preferably 0.2–2.0 p.s.i.a. for gasoline, 0.07–0.3 p.s.i.a. for kerosine and 0.05–0.3 ps.i.a. for gas oil fractions.

The purge duration should preferably not exceed 3 minutes, 1–2 minutes being preferred. The adsorption and desorption periods may be respectively, 1–5 preferably 1–2 minutes and 2–10 preferably 3–8 minutes.

Although the process can be operated with any number of beds above 2, it has been found most convenient to operate with 4 beds.

Using 4 beds typical durations of the adsorption, purge and desorption are: feed 2 mins., purge 1½ mins., desorption 4½ mins., and using 3 beds: feed 3 mins., purge 1½ mins., desorption 4½ mins.

Other suitable cycle times for 3, 4 and 5 beds operation are as follows:

|  | 4 adsorbers | 3 adsorbers | 5 adsorbers |
|---|---|---|---|
| Feed, min | 2.0 | 3.0 | 1.5 |
| Purge, min | 0.5 | 0.75 | 0.5 |
| Desorb, min | 5.5 | 5.25 | 5.5 |

It has been found that the process can be run using all 4 beds for 43 weeks in a year and 3 beds for the remainder of the operating year.

The invention is illustrated by the following example: A feed consisting of kerosine of boiling range 174–254° C. containing 15% wt. $n$-paraffin was separated into $n$-paraffins of 98% wt. purity in the following process:

temperature 380° C. throughout
liquid hourly space velocity of feed 1.8 v./v./hour
feed duration 2 mins.
pressure during feed stage 25 p.s.i.a.
purge duration 1½ mins.
desorption duration 4½ mins.
final purge pressure 80 mm.
final desorption pressure 5 mm.

The pressure reduction for the purge and desorption stages was effected by directly condensing the effluent vapours from the purge and desorption stages with a quench liquid in a tower. Liquid from the tower base was cooled externally to the tower and returned to the tower as quench liquid.

The process was operated using the above cycle timings for 83 days after which time 1 bed was taken out at a time for regeneration. The process was operated for 12 days using 3 beds with the following cycle timings.

feed duration—3 mins. feed LHSV 1.2
purge duration—1½ mins.
desorption duration 4½ mins.

the other operating conditions being the same as described above. After all the beds had been regenerated in turn, the process was once again operated using 4 beds.

To produce the required annual output of n-paraffin which was 27,000 tons, the weight of sieve required in each bed was 11.6 tons, i.e. a total weight of 46.4 tons. Using the system of 5 beds described in UK Pat. No. 1,026,116 the weight of sieve required in each adsorber was 10.9 tons i.e. a total weight of 54.5 tons. Thus, it can be seen that the method of the present invention is more efficient in that the weight of the sieve required is less and the number of vessels valves and pipework is reduced.

The process is illustrated in FIGS. 1 and 2. In FIG. 1, 4 beds are shown at 7, 8, 9 and 10 which are, respectively, feeding, desorbing and purging. Desorption is effected by a desorption vacuum system comprising a pump 5 and a cooler 4 and a contact tower 2 using a quench liquid flowing down tower 2 countercurrent to the effluent from adsorbers 8 and 9.

The n-paraffin product is withdrawn from line 11. Purging is effected by a purge vacuum system comprising a pump 5, cooler 3 and contact tower 1 using a quench liquid flowing down tower 1 countercurrent to the effluent from adsorber 10. Purge product is withdrawn from line 12. Feed is admitted via line 14 to adsorbers 7, 8, 9 and 10 and the non normal product withdrawn from line 13.

When an adsorber is regenerated, gas for the regeneration is admitted from line 15 and withdrawn from line 16.

In FIG. 2 the upper drawing shows a 3 adsorber system and the lower drawing a four adsorber system. The figure shows what stage each adsorber in the two systems has reached at any given instant.

I claim:

1. A process for the separation of n-paraffins from mixtures of the same with branched chain and/or cyclo-paraffins by employing 3 or more beds of 5 A. molecular sieve at a temperature of 300 to 450° C. and using stages of adsorption, purge and desorption wherein to maintain a continuous feed the durations of the three stages satisfy the formula $$\frac{p+d}{f} = \text{number of adsorbers} - 1$$

where $p$, $d$ and $f$ are the durations of the purge, desorption and absorption stages respectively which process comprises periodically taking one bed out of use and adjusting the space velocity and the cycle timings of the remaining beds so that the amount of feed per cycle remains unchanged.

2. A process as claimed in claim 1 wherein the purge and desorption stages are effected by pressure reduction.

3. A process as claimed in claim 2 wherein the feed is a gasoline and the adsorption pressure is 40 to 100 p.s.i.a., purge pressure from 0.1 to 25 p.s.i.a. and the desorption pressure 0.2 to 2.0 p.s.i.a.

4. A process as claimed in claim 2 wherein the feed is a kerosine and the adsorption pressure is 15 to 35 p.s.i.a. the purge pressure from 0.1 to 25 p.s.i.a. and the desorption pressure from 0.1 to 0.3 p.s.i.a.

5. A process as claimed in claim 2 wherein the feed is a gas oil and the adsorption pressure is 10 to 30 p.s.i.a. the purge pressure 0.1 to 25 p.s.i.a and the desorption pressure 0.05 to 0.3 p.s.i.a.

References Cited
UNITED STATES PATENTS

| | | | |
|---|---|---|---|
| 3,141,748 | 7/1964 | Hoke et al. | 208—310 |
| 3,201,490 | 8/1965 | Lacey et al. | 280—310 |
| 3,347,783 | 10/1967 | Feldbauer | 208—310 |
| 3,422,003 | 1/1969 | Anstey et al. | 208—310 |
| 3,428,552 | 2/1969 | Turnbull et al. | 208—310 |

FOREIGN PATENTS

| | | | |
|---|---|---|---|
| 851,977 | 9/1960 | Great Britain | 208—310 |

DELBERT E. GANTZ, Primary Examiner

C. E. SPRESSER, Jr., Assistant Examiner

U.S. Cl. X.R.

260—676 MS

PO-1050
(5/69)

UNITED STATES PATENT OFFICE
CERTIFICATE OF CORRECTION

Patent No. 3,843,514                    Dated October 22, 1974

Inventor(s) Ivor Lloyd Edwards

It is certified that error appears in the above-identified patent and that said Letters Patent are hereby corrected as shown below:

Column 1, lines 69-70, before "n-heptane" insert -- n-pentane or --;

Column 2, line 19, "p.i.s.a." should read -- p.s.i.a. --;

Column 2, line 35, "ps.i.a." should read -- p.s.i.a. --;

Signed and sealed this 31st day of December 1974.

(SEAL)
Attest:

McCOY M. GIBSON JR.
Attesting Officer

C. MARSHALL DANN
Commissioner of Patents